US011137596B2

(12) United States Patent
Marić et al.

(10) Patent No.: US 11,137,596 B2
(45) Date of Patent: Oct. 5, 2021

(54) OPTICAL ADJUSTMENT FOR HEAD-MOUNTABLE DEVICE

(71) Applicant: Apple Inc., Cupertino, CA (US)

(72) Inventors: Ivan S. Marić, Sunnyvale, CA (US); Jan K. Quijalvo, Mississauga (CA)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/938,770

(22) Filed: Jul. 24, 2020

(65) Prior Publication Data

US 2021/0063734 A1 Mar. 4, 2021

Related U.S. Application Data

(60) Provisional application No. 62/893,682, filed on Aug. 29, 2019.

(51) Int. Cl.
*G09G 5/00* (2006.01)
*G02B 27/00* (2006.01)
*G02B 27/01* (2006.01)
*G01P 15/00* (2006.01)

(52) U.S. Cl.
CPC .......... *G02B 27/0093* (2013.01); *G01P 15/00* (2013.01); *G02B 27/0101* (2013.01); *G02B 27/0172* (2013.01); *G02B 27/0176* (2013.01); *G02B 27/0179* (2013.01); *G02B 2027/0138* (2013.01); *G02B 2027/0187* (2013.01)

(58) Field of Classification Search
CPC ............ G02B 27/0093; G02B 27/0101; G02B 27/0172; G01P 15/00
USPC .......................................................... 345/8
See application file for complete search history.

(56) References Cited

U.S. PATENT DOCUMENTS

| | | | |
|---|---|---|---|
| 9,094,677 B1 | 7/2015 | Mendis et al. | |
| 10,078,223 B2 | 9/2018 | Magyari | |
| 10,502,363 B2 | 12/2019 | Edwards | |
| 2014/0168264 A1 | 6/2014 | Harrison et al. | |
| 2016/0062454 A1* | 3/2016 | Wang | G09G 5/003 345/633 |
| 2016/0247282 A1* | 8/2016 | Mullins | G02B 27/017 |
| 2017/0148215 A1* | 5/2017 | Aksoy | G06F 3/013 |
| 2017/0161951 A1* | 6/2017 | Fix | G06K 9/00604 |
| 2017/0285863 A1* | 10/2017 | Macintosh | G06F 3/0393 |
| 2018/0217383 A1* | 8/2018 | Guenter | G06K 9/00671 |
| 2019/0258442 A1* | 8/2019 | Hudman | G02B 27/0179 |
| 2019/0293942 A1* | 9/2019 | Lin | G02B 27/01 |

* cited by examiner

*Primary Examiner* — Jonathan M Blancha
(74) *Attorney, Agent, or Firm* — Morgan, Lewis & Bockius LLP

(57) ABSTRACT

A head-mountable device can include an optical module that provides a display element and/or an optical element that are adjustably mounted. The display element and/or another optical element can be adjusted by actuation of a mechanism that allows the display element and/or the optical element to move in one or more (e.g., six) degrees of freedom (roll, pitch, and yaw). The actuation allows for the position of the display element to be adjusted relative to the optical element to correct for any displacements caused during operation of the head-mountable device. One or more sensors within the optical module or external to the optical module and/or the head-mountable device can detect the position of the display at an initial state as well as thereafter. The sensors can check for changes in the position of the components to provide a basis for the actuation.

20 Claims, 4 Drawing Sheets

OPTICAL ADJUSTMENT FOR HEAD-MOUNTABLE DEVICE

CROSS-REFERENCE TO RELATED APPLICATION

This application claims the benefit of U.S. Provisional Application No. 62/893,682, entitled "OPTICAL ADJUSTMENT FOR HEAD-MOUNTABLE DEVICE," filed Aug. 29, 2019, the entirety of which is incorporated herein by reference.

TECHNICAL FIELD

The present description relates generally to head-mountable devices, and, more particularly, to display adjustment and correction for head-mountable devices.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
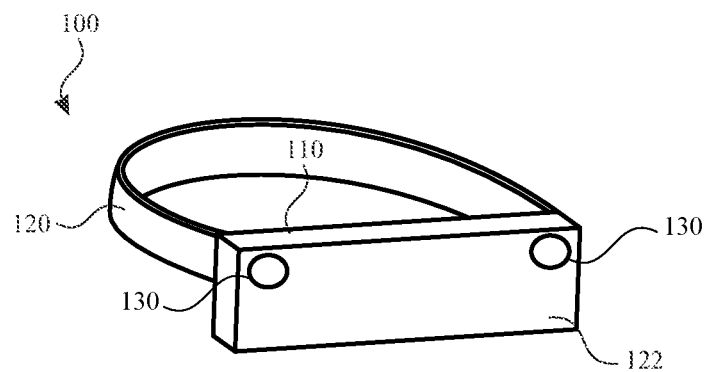
FIG. 1 illustrates a perspective view of a head-mountable device on a user, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device. The head-mountable device can provide a user experience that is immersive or otherwise natural so the user can easily focus on enjoying the experience without being distracted by the mechanisms of the head-mountable device.

Components of a head-mountable device can include one or more optical modules that provide images and/or views (e.g., to an external environment). Such optical modules can include a display element and/or optical elements that enhance a user's view. The display element can be oriented in a direction that optimally provides a view along an optical pathway between the display element and the eye of the user. For example, the display element can emit light along the optical pathway to arrive at the user's eye.

During use and across the lifespan of the head-mountable device, the optical components, including the display element, can become misaligned. For example, the support structure supporting a display element can be altered due to shock (e.g., drop event, impact, etc.), degradation, erosion, friction, wear, and/or aging of components. High-resolution displays in head-mountable devices are sensitive to misalignment. Angular or positional shifts can cause user discomfort due to monocular focus gradients, binocular focus differences, degradation in image sharpness, and reductions or shifts in the field of view (FOV). While the head-mountable device can be aligned during assembly, it can be beneficial to maintain and/or correct the alignment of a display element to an optical element (e.g., lens).

Systems of the present disclosure can include a head-mountable device with an optical module that provides a display element and/or an optical element that are adjustably mounted. The display element and/or another optical element can be adjusted by actuation of a mechanism that allows the display element and/or the optical element to move in one or more (e.g., six) degrees of freedom (roll, pitch, and yaw). The actuation allows for the position of the display element to be adjusted relative to the optical element to correct for any displacements caused during operation of the head-mountable device. One or more sensors within the optical module or external to the optical module and/or the head-mountable device can detect the position of the display at an initial state as well as thereafter. The sensors can check for changes in the position of the components to provide a basis for the actuation.

A head-mountable device having the features described herein can improve the user experience therewith by correcting for shifts in the display position and/or orientation over time, which can occur as a result of regular handling by a user and/or transportation from the factory to a point-of-sale. Correcting for such shifts can beneficially maintain the optical performance of a head-mountable device, which can be greatly degraded by small shifts, especially in the tip/tilt of display elements relative to optical elements (e.g., lenses).

Such mechanisms can be optionally entirely contained within an enclosed optical module and can therefore correct for shifts without user intervention or interruption. Furthermore, such adjustments can reduce and/or eliminate the cost and time required to service the head-mountable device to restore display alignment.

These and other embodiments are discussed below with reference to FIGS. 1-6. However, those skilled in the art will readily appreciate that the detailed description given herein with respect to these Figures is for explanatory purposes only and should not be construed as limiting.

According to some embodiments, for example as shown in FIG. 1, a head-mountable device 100 includes a frame 110 that is worn on a head of a user. The frame 110 can be positioned in front of the eyes of a user to provide information within a field of view of the user. The frame 110 can provide nose pads or another feature to rest on a user's nose. The frame 110 can be supported on a user's head with the securement element 120. The securement element 120 can wrap or extend along opposing sides of a user's head. The securement element 120 can include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated components of the head-mountable device 100. By further example, the securement element 120 can include multiple components to engage a user's head.

The frame 110 can provide structure around a peripheral region thereof to support any internal components of the frame 110 in their assembled position. For example, the frame 110 can enclose and support various internal components (including for example integrated circuit chips, processors, memory devices and other circuitry) to provide computing and functional operations for the head-mountable device 100, as discussed further herein. Any number of components can be included within and/or on the frame 110 and/or the securement element 120.

The frame 110 can include and/or support one or more camera modules 130. The camera modules 130 can be positioned on or near an outer side 122 of the frame 110 to capture images of views external to the head-mountable device 100. As used herein, an outer side of a portion of a head-mountable device is a side that faces away from the user and/or towards an external environment. The captured images can be used for display to the user or stored for any other purpose.

Figure 2:
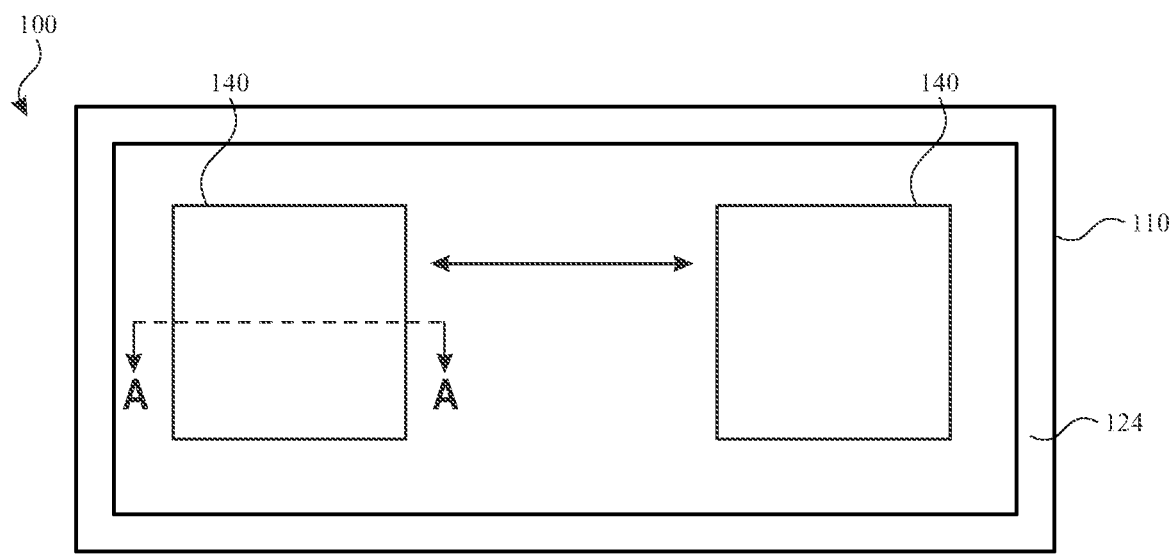
FIG. 2 illustrates a rear view of a head-mountable device, according to some embodiments of the present disclosure.

Referring now to FIG. 2, a head-mountable device can be provided with optical modules that provide visual output for viewing by a user wearing the head-mountable device. As shown in FIG. 2, one or more optical modules 140 can be positioned on an inner side 124 of the frame 110. As used herein, an inner side of a portion of a head-mountable device is a side that faces toward the user and/or away from the external environment. For example, a pair of optical modules 140 can be provided, where each optical module 140 is movably positioned to be within the field of view of each of a user's two eyes. Each optical module 140 can be adjusted to align with a corresponding eye of the user. For example, each optical module 140 can be moved along one or more axes until a center of each optical module 140 is aligned with a center of the corresponding eye. Accordingly, the distance between the optical modules 140 can be set based on an interpupillary distance of the user. For example, one or more module actuators can be provided to move the optical module 140 relative to the frame 110 of the head-mountable device 100.

Movement of each of the optical modules can match movement of a corresponding camera module. For example, each optical module 140 can be supported on the inner side 124 of the frame 110, and a camera 130 can be coupled to and movable with a corresponding one of the optical modules 140. The optical module 140 can be adjusted to align with the corresponding eye of the user, and the camera 130 can be correspondingly adjusted so that the field of view provided by the optical module 140 corresponds to a field of view captured by the camera 130. Accordingly, the optical module 140 is able to accurately reproduce, simulate, or augment a view based on a view captured by the camera 130 with an alignment that corresponds to the view that the user would have naturally without the head-mountable device 100.

An optical module 140 can transmit light from a physical environment (e.g., as captured by a camera module) for viewing by the user. Such an optical module 140 can include optical properties, such as lenses for vision correction based on incoming light from the physical environment. Additionally or alternatively, an optical module 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 3:
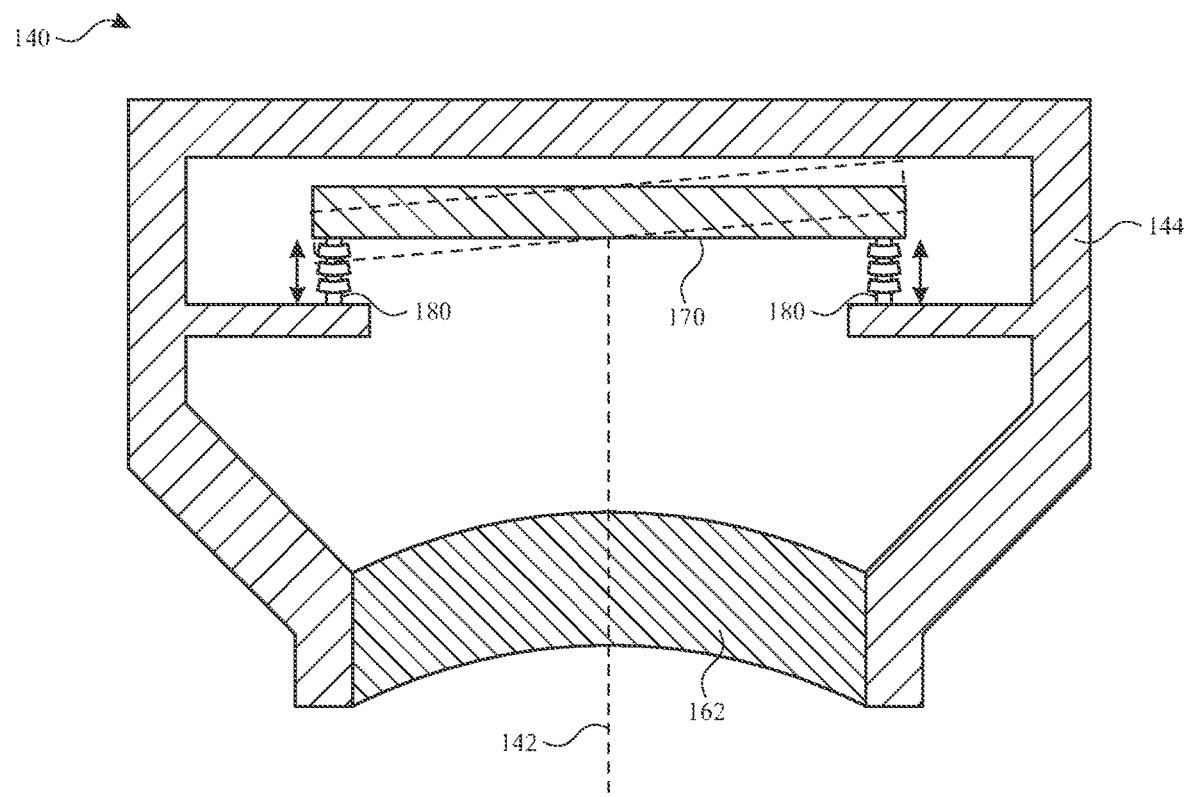
FIG. 3 illustrates a sectional view of an optical module of the head-mountable device of FIG. 2 taken along line A-A, according to some embodiments of the present disclosure.

Referring now to FIG. 3, an optical module can provide visual output for viewing by a user. While a single optical module 140 as shown in FIG. 3, it will be understood that separate optical modules can be provided for each of the user's two eyes. Each of the optical modules 140 can be adjusted to align with the corresponding eye of the user.

The optical module 140 can include a housing 144 that encloses individual components of the optical module 140. The housing 144 can support an optical element 162 that provides a view to an interior portion of the housing 144 (e.g., to a display element within the housing 144). While the optical element 162 is shown as a lens in FIG. 3, it will be understood that the optical element 162 can include or be provided with one or more diffusers, filters, polarizers, prisms, beam splitters, diffraction gratings, mirrors, and/or windows. The housing 144 and the optical element 162 can together define an outer periphery of the optical module 140 and sealingly enclose the interior thereof. For example, an interior space of the optical module 140 can be isolated (e.g., hermetically sealed) from an external environment.

The optical module 140 can be operated for displaying visual information for a user. The optical module 140 can provide visual (e.g., image or video) output. The optical module 140 can include a display element 170, such as an opaque, transparent, and/or translucent display screen. The display element 170 can emit light. Additionally or alternatively, the display element 170 can have a transparent or translucent medium through which light representative of images is directed to a user's eyes. The display element 170 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The optical module 140 can include the optical element 162 configured to help optically adjust and correctly project the image-based content being displayed by the display element 170 for close-up viewing. The display element 170 and/or the optical element 162 can be positioned along an optical pathway 142 along which a user may be provided with a view of the visual information output by the display element 170. For example, the optical pathway 142 can be defined as a pathway along which light travels from the display element 170, through the optical element 162, and to the user's eye. While the optical pathway 142 is shown in FIG. 3 as a line or axis, it will be understood that the optical pathway 142 can include all pathways and regions along which light can travel from the display element 170 to the user's eye. Such an optical pathway 142 can include pathways through the optical element 162 and/or any other optical element or combination of optical elements.

One or more actuators can be provided to move individual components of the optical module 140 in a manner that maintains and/or restores the components to a desired alignment with each other and/or other structures. As shown in FIG. 3, one or more actuators 180 can be provided to move the display element 170 relative to the housing 144 and/or the optical element 162 of the optical module 140. The actuators 180 can be coupled to the housing 144 and the display element 170 to alter distance there between at one or more locations. Additionally or alternatively, the actuators 180 can be coupled to one or more other components of the optical module 140, such as the optical element 162. The actuators 180 can include or be connected to motors, hydraulic actuators, pneumatic actuators, magnetic actuators, piezoelectric actuators, electroactive materials (e.g., polymers), stepper motors, shape-memory alloys, and the like, as well as drivetrain components such as gears, clutches, and/or transmissions, to facilitate independent or simultaneous movement of components based on operation of corresponding actuators. The movements can be facilitated by rails, grooves, pathways, gimbals, and/or other structures that receive, engage, and/or interact with each other to guide, limit, and/or direct movement.

It will be understood that the actuators 180 can move the display element 170 in any of one or more directions. For example, the actuators 180 can move the display element 170 relative to the housing 144 and/or the optical element 162 of the optical module 140. Movement of the display element 170 relative to one component of the optical module 140 will be understood to include movement relative to other components of the optical module 140 where such components have a fixed relationship to each other. The movement can be translational, such that the display element 170 can be adjusted to change its position relative to one or more other structures. For example, the actuators 180 can move the display element 170 along any axis (e.g., defined by the optical pathway 142) and/or a curved pathway. By further example, the actuators 180 can move the display element 170 in a direction that is transverse to an axis (e.g., the optical pathway 142). Additionally or alternatively, the movement can be rotational, such that the display element 170 can be adjusted to change its orientation relative to one or more other structures. For example, the actuators 180 can rotate the display element 170 about an axis that extends through the display element 170 and/or outside the display element 170. By further example, the actuators 180 can rotate the display element 170 about the optical pathway 142. By further example, the actuators 180 can rotate the display element 170 with respect to the optical pathway 142 to adjust an angle formed therewith. For example, the display element 170 can be adjusted to be orthogonal to the optical pathway 142 (i.e., emitting light parallel to and/or along the optical pathway 142). It will be understood that the operation of one or more actuators 180 can be coordinated to achieve any desired translational and/or rotational movement in three-dimensional space within a range of motion provided by the actuators 180. It will be further understood that not all actuators 180 must be operated to achieve a desired movement. For example, movement of the display element 170 can be achieved by operating fewer than all of the actuators 180, such that some portions of the display element 170 are moved while other portions of the display element 170 remain stationary.

Figure 4:
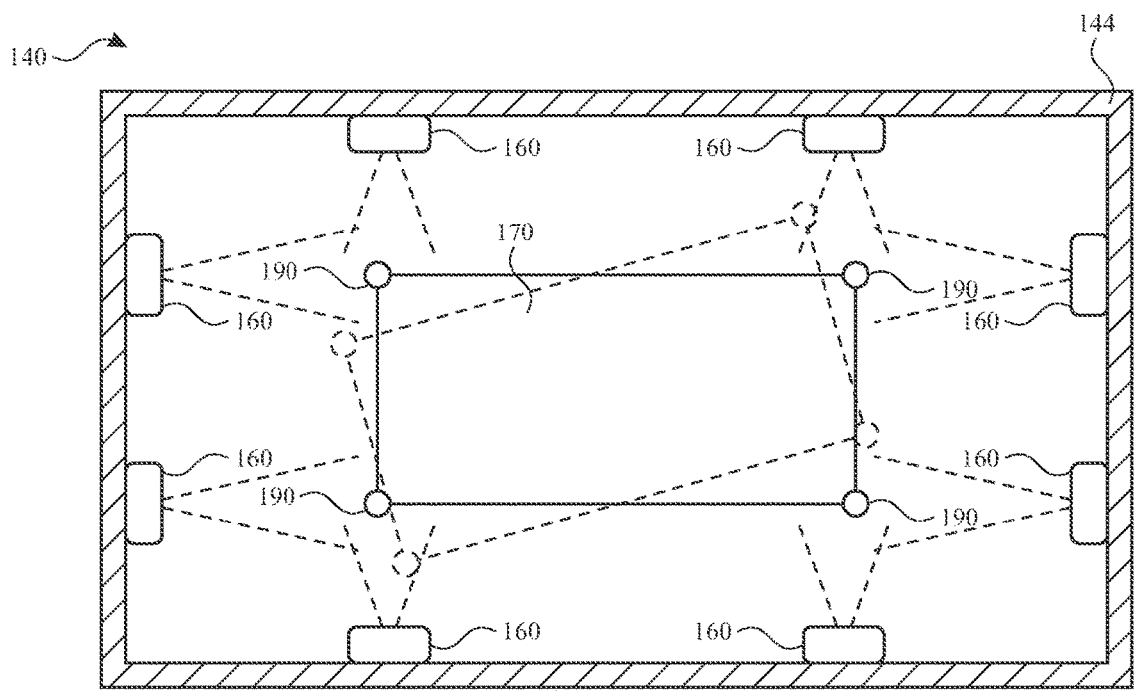
FIG. 4 illustrates another sectional view of the optical module of the head-mountable device of FIG. 2, according to some embodiments of the present disclosure.

Referring now to FIG. 4, the optical module 140 can include one or more display sensors 160 that are configured to detect the position and/or orientation of the display element 170. Operation of the actuators 180 and/or other mechanisms can be based on the detections made by the display sensors 160.

For example, a display sensor 160 (e.g., camera) can be oriented so that it is directed toward the display element 170. The display sensor 160 can be operated to optically detect the position and/or orientation of the display element 170. Such detections can be direct or indirect. For example, the display sensor 160 can detect the display element 170, an image projected by the display element 170, and/or one or more markers 190 coupled to the display element 170.

For example, a detection can be facilitated by capturing a view of the display element 170 and/or one or more markers 190 coupled to the display element 170. The markers 190 can be optically or otherwise distinguishable from other structures, such as the display element 170, so that the sensors 160 can detect the position of the markers 190 within a field of view thereof. The markers 190 can be fixedly coupled to the display element 170 such that movement of the markers 190 corresponds to and is indicative of movement of the display element 170. Any number of markers 190 can be provided and in any arrangement. It will be understood that multiple markers that are spaced apart from each other can provide a basis for determining their relative positions in three-dimensional space. The view of the display element 170 and/or one or more markers 190 that is captured by each of the display sensors 160 can be compared to a target view that is expected based on a target alignment (e.g., initial alignment) of the display element 170. Any difference between the captured view and the target view can indicate a misalignment of the display element 160. Accordingly, corrective adjustments can be made based on the captured view and the target view, By further example, a detection can be facilitated by coordinating with the display element 170 to display a known image. The view of the known image as captured by each of the display sensors 160 can be compared to the target image that is expected based on a target alignment (e.g., initial alignment) of the display element 170. Any difference between the actual image and the target image can indicate a misalignment of the display element 160. Accordingly, corrective adjustments can be made based on the actual image and the target image.

While the depicted display sensors 160 are shown as being positioned within the housing 144, it will be understood that one or more display sensors can be positioned outside of the housing 144 to capture a view of the optical element 162 and/or the display element 170. For example, a display sensor 160 can be positioned outside the housing 144 and otherwise coupled to the optical module 140. The display sensor 160 can capture a view of the optical element 162 and/or the display element 170 (e.g., through the optical element 162) to detect the alignment of the display element 170.

Figure 5:
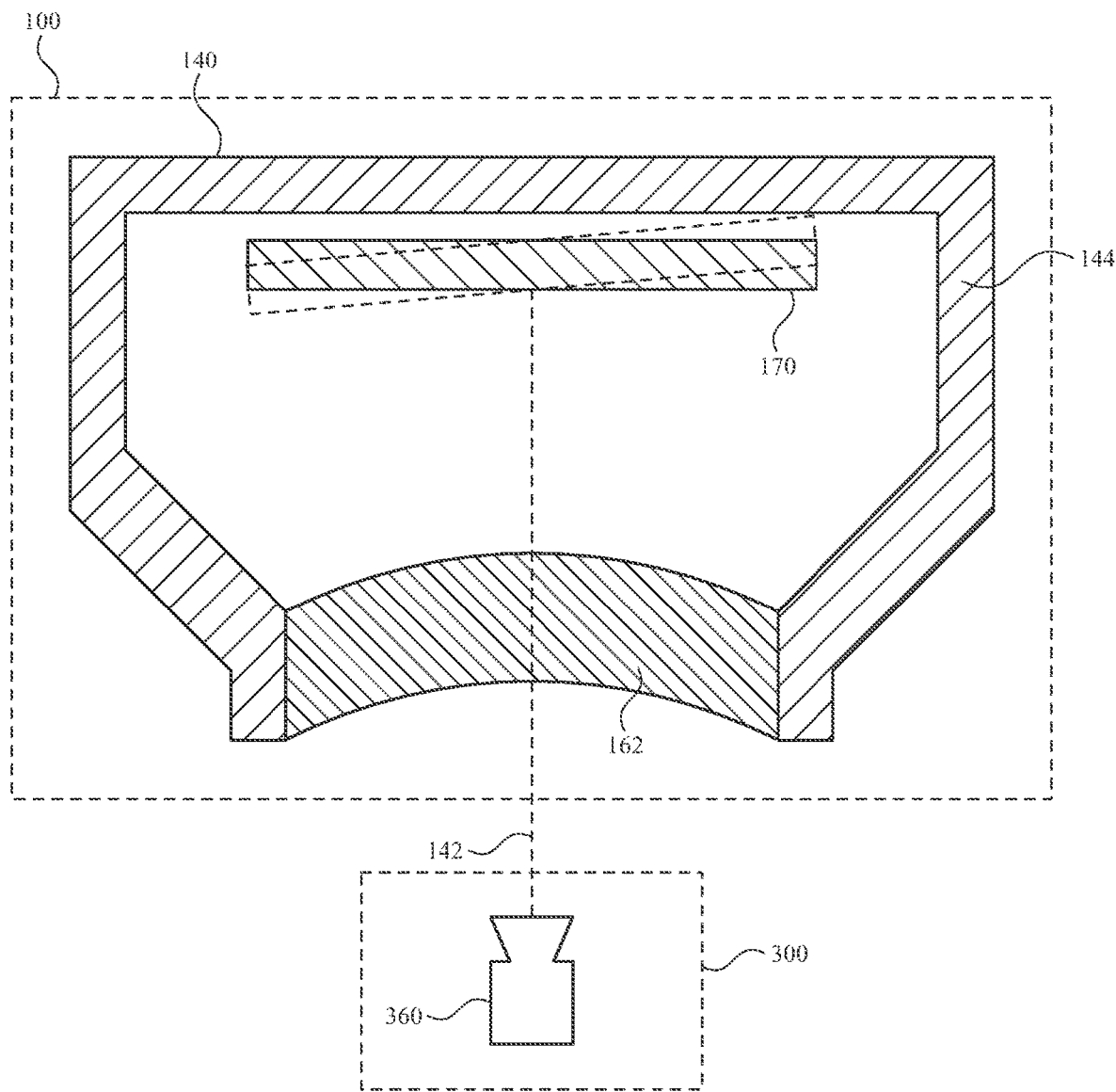
FIG. 5 illustrates a sectional view of an optical module of the head-mountable device of FIG. 2 with an external device for alignment detection, according to some embodiments of the present disclosure.

Referring now to FIG. 5, the head-mountable device 100 can operate in concert with an external device 300 that is configured to provide detections. The external device 300 can provide charging, diagnostics, and/or communications connectivity to the head-mountable device 100. In some embodiments, the external device 300 can include an external sensor 360 that can operate in a manner similar to the sensor 160. For example, when the head-mountable device 100 is coupled to the external device 300, the external sensor 360 can be positioned outside the optical module to capture a view of the optical element 162 and/or the display element 170 (e.g., through the optical element 162) to detect alignment of the display element 170. The relative positions and orientations of the head-mountable device 100 and the external device 300 can be known and maintained during coupling thereof. Detections can be communicated to the head-mountable device 100, and operation of the actuators can be based on the detections made by the external sensor 360. While only one external sensor 360 is depicted in FIG. 5, it will be understood that any number of external sensors 360 can form an array that operates in concert to perform the detections described herein.

Based on detections performed by the display sensors 160 and/or the external sensor 360, the position and/or orientation of the display element 170 can be determined at various points in time. For example, the position and/or orientation of the display element 170 can be detected at an initial stage, such as during and/or after assembly of the optical module 140 and/or the head-mountable device 100. Such assembly can be performed in a manner that properly aligns the display element 170 within the system (e.g., relative to the optical element 162 and/or the housing 144). Accordingly, detections made at this stage can be recorded as corresponding to a target alignment. By further example, the position and/or orientation of the display element 170 can be detected at a later stage, such as after usage of the head-mountable device 100. At such a stage, the display sensors 160 and/or the external sensor 360 can be operated to detect the position and/or orientation of the display element 170. The detected position and/or orientation of the display element 170 can be compared to a target position and/or orientation of the display element 170, as described herein. Based on the comparison, the actuators can be operated to adjust the position and/or orientation of the display element 170 so that it aligns with the target position and/or orientation.

Adjustments to a display element can be performed following any detection that a misalignment has occurred or otherwise developed. Detections can be initiated based on one or more of a variety of conditions. For example, detections can be performed periodically, continually, and/or combinations thereof. By further example, the head-mountable device can detect (e.g., by an accelerometer, gyroscope, etc.) an event (e.g., drop event, impact, shock, etc.) that may result in misalignment of the display element and determine that a detection of the display element and/or adjustment is to be performed. By further example, the head-mountable device can receive a command from a user (e.g., from a user input component) to perform a detection and/or adjustment. By further example, the head-mountable device can reference a predetermined schedule and/or period of time to determine that a detection and/or adjustment is to be performed. By further example, the head-mountable device can determine that a procedure to boot up and/or boot down the head-mountable device has been initiated and further determine that a detection and/or adjustment is to be performed before, during, and/or after such a procedure. By further example, the head-mountable device can determine that it is or is not being worn by a user and can further determine that a detection and/or adjustment is to be performed under such a condition. By further example, the head-mountable device can determine that it is or is not coupled to an external device (e.g., charging station) and can further determine that a detection and/or adjustment is to be performed under such a condition.

While detections and adjustments can be performed with respect to a display element, it will be understood that, additionally or alternatively, detections and adjustments can be performed with respect to one or more other components of the optical module 140. For example, the optical element 162 and/or another optical element can be subject to misalignment during use of the head-mountable device 100. Detection of the alignment of the optical element 162 can be performed (e.g., by an additional sensor similar to or including the display sensors 160) in a manner similar to that described herein with respect to the display element 170. For example, the optical element 152 can include markers similar to markers 190 of the display element 170. Furthermore, adjustment of the alignment of the optical element 162 can be performed (e.g., by an additional actuator similar to or including the actuators 180) in a manner similar to that described herein with respect to the display element 170.

Figure 6:
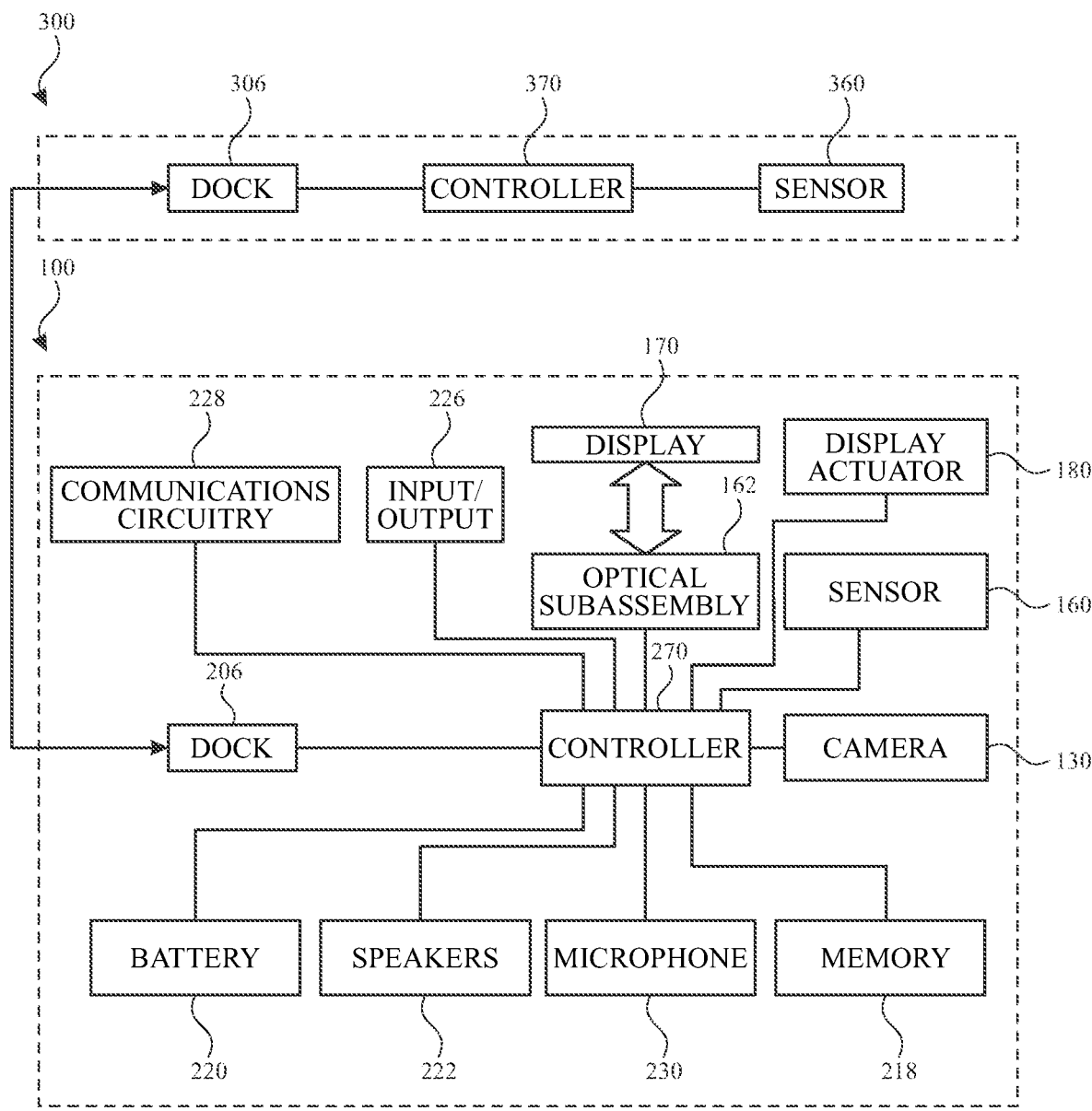
FIG. 6 illustrates a block diagram of a head-mountable device, in accordance with some embodiments of the present disclosure.

Referring now to FIG. 6, components of the head-mountable device can be operably connected to provide the performance described herein. FIG. 6 shows a simplified block diagram of an illustrative head-mountable device 100 in accordance with one embodiment of the invention. It will be appreciated that components described herein can be provided on either or both of a frame and/or a securement element of the head-mountable device 100.

As shown in FIG. 6, the head-mountable device 100 can include a controller 270 with one or more processing units that include or are configured to access a memory 218 having instructions stored thereon. The instructions or computer programs may be configured to perform one or more of the operations or functions described with respect to the head-mountable device 100. The controller 270 can be implemented as any electronic device capable of processing, receiving, or transmitting data or instructions. For example, the controller 270 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 218 can store electronic data that can be used by the head-mountable device 100. For example, the memory 218 can store electrical data or content such as, for example, audio and video files, documents and applications, device settings and user preferences, timing and control signals or data for the various modules, data structures or databases, and so on. The memory 218 can be configured as any type of memory. By way of example only, the memory 218 can be implemented as random access memory, read-only memory, Flash memory, removable memory, or other types of storage elements, or combinations of such devices.

The head-mountable device 100 can further include an optical module for displaying visual information for a user, including the display element 170 and/or an optical subassembly (e.g., the optical element 162), as discussed herein. The head-mountable device 100 can further include the actuators 180, as discussed herein. The head-mountable device 100 can further include the one or more display sensors 160, as discussed herein. The display sensor 160 can include an optical sensor, such as a photodiode or a photodiode array. Additionally or alternatively, the display sensor 160 can include one or more of various types of optical sensors that are arranged in various configurations for optically detecting the display element 170, an image output thereby, and/or markers. The display sensor 160 can include an image sensor formed from a charge-coupled device (CCD) and/or a complementary metal-oxide-semiconductor (CMOS) device, a photovoltaic cell, a photo resistive component, a laser scanner, and the like.

The head-mountable device 100 can include the camera 130 for capturing a view of an environment external to the head-mountable device 100. The camera 130 can include an optical sensor, such as a photodiode or a photodiode array. Additionally or alternatively, the camera 130 can include one or more of various types of optical sensors that are arranged in various configurations for detecting user inputs described herein. The camera 130 may be configured to capture an image of a scene or subject located within a field of view of the camera 130. The image may be stored in a digital file in accordance with any one of a number of digital formats. In some embodiments, the head-mountable device 100 includes a camera, which includes an image sensor formed from a charge-coupled device (CCD) and/or a complementary metal-oxide-semiconductor (CMOS) device, a photovoltaic cell, a photo resistive component, a laser scanner, and the like. It will be recognized that a camera can include other motion sensing devices.

The head-mountable device 100 can include a battery 220, which can charge and/or power components of the head-mountable device 100.

The head-mountable device 100 can include an input/output component 226, which can include any suitable component for connecting head-mountable device 100 to other devices. Suitable components can include, for example, audio/video jacks, data connectors, and/or any additional or alternative input/output components.

The head-mountable device 100 can include communications circuitry 228 for communicating with one or more servers or other devices using any suitable communications protocol. For example, the communications circuitry 228 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. The communications circuitry 228 can also include an antenna for transmitting and receiving electromagnetic signals.

The head-mountable device 100 can include a microphone 230. The microphone 230 can be operably connected to the controller 270 for receiving audio input, including voice commands from the user.

The head-mountable device 100 can include speakers 222. The speakers 222 can be operably connected to the controller 270 for control of speaker output, including sound levels.

The head-mountable device 100 can include a dock 206 operative to connect to the external device 300 via a dock 306 thereof. The dock 206 can include a connector (e.g., Lightning, USB, FireWire, power, DVI, etc.), which can be plugged into a complementary connector of the external device 300. The dock 206 may include features for helping to align the connectors during engagement and for physically coupling the head-mountable device 100 to the external device 300. The external device 300 can provide charging, diagnostics, and/or communications connectivity to the head-mountable device 100. In some embodiments, the external device 300 can include the external sensor 360 as described herein. Detections can be communicated to the head-mountable device 100 (e.g., via the dock 306 and the dock 206), and operation of the actuators and/or other mechanisms can be based on the detections made by the external sensor 360.

The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc.

Accordingly, embodiments of the present disclosure provide a head-mountable device with an optical module that provides a display element and/or an optical element that are adjustably mounted. The display element and/or another optical element can be adjusted by actuation of a mechanism that allows the display element and/or the optical element to move in one or more (e.g., six) degrees of freedom (roll, pitch, and yaw). The actuation allows for the position of the display element to be adjusted relative to the optical element to correct for any displacements caused during operation of the head-mountable device. One or more sensors within the optical module or external to the optical module and/or the head-mountable device can detect the position of the display at an initial state as well as thereafter. The sensors can check for changes in the position of the components to provide a basis for the actuation.

Various examples of aspects of the disclosure are described below as clauses for convenience. These are provided as examples, and do not limit the subject technology.

Clause A: a head-mountable device comprising: a frame; and a pair of optical modules, each of the optical modules being movable relative to the frame and comprising: a housing; a display element within the housing; and an optical element providing a view to the display element from outside the housing; a display sensor within the housing and configured to detect an alignment of the display element relative to the housing; and an actuator configured to move the display element relative to the housing based on the alignment detected by the display sensor.

Clause B: a head-mountable device comprising: an optical module comprising: a housing; a display element within the housing; an optical element providing a view to the display element along an optical pathway; a display sensor within the housing and configured to detect an alignment of the display element with respect to the optical element; and an actuator configured to move the display element relative to the housing; and a controller configured to perform the operations of: operating the display sensor to determine a detected alignment of the display element; comparing the detected alignment to a target alignment of the display element; and based on the detected alignment and the target alignment, operating the actuator.

Clause C: a head-mountable device comprising: an optical module comprising: a housing; a display element within the housing; an optical element providing a view to the display element along an optical pathway; and an actuator configured to move the display element relative to the housing; and a controller configured to: receive from an external device an indication of a detected alignment of the display element; compare the detected alignment to a target alignment of the display element; and based on the detected alignment and the target alignment, operate the actuator.

One or more of the above clauses can include one or more of the features described below. It is noted that any of the following clauses may be combined in any combination with each other, and placed into a respective independent clause, e.g., clause A, B, or C.

Clause 1: the actuator couples the display element to the housing.

Clause 2: the actuator is operable to adjust an orientation of the display element relative to the optical element.

Clause 3: the actuator is operable to adjust a position of the display element relative to the optical element.

Clause 4: each of the optical modules further comprises markers coupled to the display element, wherein the display sensor is configured to determine a position of each of the markers within the housing.

Clause 5: each of the optical modules further comprises: an additional sensor configured to detect an alignment of the optical element relative to the housing; and an additional actuator configured to move the optical element relative to the housing based on the alignment detected by the additional sensor.

Clause 6: each of the optical modules is positioned on an inner side of the frame, the head-mountable device further comprising cameras on an outer side of the frame, each of the cameras being movable with a corresponding one of the optical modules.

Clause 7: the optical module is a first optical module and the head-mountable device further comprises a second optical module, wherein each of the first optical module and the second optical module are moveable relative to a frame of the head-mountable device to align with a corresponding one of a user's eyes.

Clause 8: the controller is further configured to operate the display element to output a known image; operating the display sensor to determine a detected alignment of the display element comprises capturing a detected image of the display element; and comparing the detected alignment to the target alignment of the display element comprises comparing the detected image to a target image that is based on the known image.

Clause 9: the target alignment is defined by the operation of, prior to operating the display sensor to determine a detected alignment of the display element, operating the display sensor to determine a target alignment of the display element.

Clause 10: the controller is further configured to perform the operation of detecting a shock to the head-mountable device, wherein operating the display sensor to determine a detected alignment of the display element is in response to detecting the shock.

Clause 11: the controller is further configured to operate the display element to output a known image; the indication of the detected alignment of the display element is based on a detected image from a view of the display element captured by an external sensor of the external device; and comparing the detected alignment to the target alignment of the display element comprises comparing the detected image to a target image that is based on the known image.

Clause 12: the target alignment is defined by the operation of, prior to receiving from the external device the indication of the detected alignment of the display element, receiving from the external device an indication of a target alignment of the display element.

Clause 13: a first dock that is configured to engage a second dock of the external device to couple the head-mountable device to the external device in a known position and orientation with respect to the external device.

Clause 14: an additional actuator configured to move the optical element relative to the housing based on an additional detection performed by the external device.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
   a frame; and
   a pair of optical modules, each of the optical modules being movable relative to the frame and comprising:
      a housing;
      a display element within the housing; and
      an optical element providing a view to the display element from outside the housing;
      a display sensor within the housing and configured to detect an alignment of the display element relative to the housing; and
      an actuator configured to move the display element relative to the housing based on the alignment detected by the display sensor.

2. The head-mountable device of claim 1, wherein the actuator couples the display element to the housing.

3. The head-mountable device of claim 1, wherein the actuator is operable to adjust an orientation of the display element relative to the optical element.

4. The head-mountable device of claim 1, wherein the actuator is operable to adjust a position of the display element relative to the optical element.

5. The head-mountable device of claim 1, wherein each of the optical modules further comprises markers coupled to the display element, wherein the display sensor is configured to determine a position of each of the markers within the housing.

6. The head-mountable device of claim 1, wherein each of the optical modules further comprises:
   an additional sensor configured to detect an alignment of the optical element relative to the housing; and
   an additional actuator configured to move the optical element relative to the housing based on the alignment detected by the additional sensor.

7. The head-mountable device of claim 1, wherein each of the optical modules is positioned on an inner side of the frame, the head-mountable device further comprising cameras on an outer side of the frame, each of the cameras being movable with a corresponding one of the optical modules.

8. A head-mountable device comprising:
   an optical module comprising:
      a housing;
      a display element within the housing;
      a display sensor within the housing and configured to detect an alignment of the display element with respect to the housing; and
      an actuator configured to move the display element relative to the housing; and
   a controller configured to perform the operations of:
      operating the display sensor to determine a detected alignment of the display element;
      comparing the detected alignment to a target alignment of the display element; and
      based on the detected alignment and the target alignment, operating the actuator to move the display element with respect to the housing.

9. The head-mountable device of claim 8, wherein the optical module is a first optical module and the head-mountable device further comprises a second optical module, wherein each of the first optical module and the second optical module are moveable relative to a frame of the head-mountable device to align with a corresponding one of a user's eyes.

10. The head-mountable device of claim 8, further comprising markers coupled to the display element, wherein the display sensor is configured to determine a position of each of the markers within the housing.

11. The head-mountable device of claim 8, wherein:
    the controller is further configured to operate the display element to output a known image;
    operating the display sensor to determine a detected alignment of the display element comprises capturing a detected image of the display element; and comparing the detected alignment to the target alignment of the display element comprises comparing the detected image to a target image that is based on the known image.

12. The head-mountable device of claim 8, wherein the target alignment is defined by the operation of, prior to operating the display sensor to determine a detected alignment of the display element, operating the display sensor to determine the target alignment of the display element.

13. The head-mountable device of claim 8, wherein the controller is further configured to perform the operation of detecting a shock to the head-mountable device, wherein operating the display sensor to determine a detected alignment of the display element is in response to detecting the shock.

14. The head-mountable device of claim 8, further comprising:
   an optical element providing a view to the display element along an optical pathway;
   an additional sensor configured to detect an alignment of the optical element relative to the housing; and
   an additional actuator configured to move the optical element relative to the housing based on the alignment detected by the additional sensor.

15. A head-mountable device comprising:
   an optical module comprising:
      a housing;
      a display element within the housing;
      an optical element providing a view to the display element along an optical pathway; and
      an actuator configured to move the display element relative to the housing; and
   a controller configured to:
      receive from an external device an indication of a detected alignment of the display element;
      compare the detected alignment to a target alignment of the display element; and
      based on the detected alignment and the target alignment, operate the actuator.

16. The head-mountable device of claim 15, wherein the optical module is a first optical module and the head-mountable device further comprises a second optical module, wherein each of the first optical module and the second optical module are moveable relative to a frame of the head-mountable device to align with a corresponding one of a user's eyes.

17. The head-mountable device of claim 15, wherein:
   the controller is further configured to operate the display element to output a known image;
   the indication of the detected alignment of the display element is based on a detected image from a view of the display element captured by an external sensor of the external device; and
   comparing the detected alignment to the target alignment of the display element comprises comparing the detected image to a target image that is based on the known image.

18. The head-mountable device of claim 15, wherein the target alignment is defined by the operation of, prior to receiving from the external device the indication of the detected alignment of the display element, receiving from the external device an indication of the target alignment of the display element.

19. The head-mountable device of claim 15, further comprising a first dock that is configured to engage a second dock of the external device to couple the head-mountable device to the external device in a known position and orientation with respect to the external device.

20. The head-mountable device of claim 15, further comprising:
   an additional actuator configured to move the optical element relative to the housing based on an additional detection performed by the external device.

\* \* \* \* \*